(12) United States Patent
Tashiro et al.

(10) Patent No.: US 8,689,950 B2
(45) Date of Patent: Apr. 8, 2014

(54) ELECTROMAGNETIC TYPE RETARDER

(75) Inventors: Yuichi Tashiro, Tokyo (JP); Mitsuyoshi Oba, Tokyo (JP); Akihiro Miyoshi, Tokyo (JP)

(73) Assignee: TBK Co., Ltd., Tokyo (JP)

( * ) Notice: Subject to any disclaimer, the term of this patent is extended or adjusted under 35 U.S.C. 154(b) by 573 days.

(21) Appl. No.: 13/030,569

(22) Filed: Feb. 18, 2011

(65) Prior Publication Data

US 2011/0214954 A1 Sep. 8, 2011

(30) Foreign Application Priority Data

Mar. 5, 2010 (JP) .................................. 2010-49187

(51) Int. Cl.
*H02K 49/02* (2006.01)
*B60L 7/26* (2006.01)

(52) U.S. Cl.
USPC .......................................... 188/267; 310/105

(58) Field of Classification Search
USPC .............. 188/156–164, 173, 267; 290/31, 32; 310/105, 113, 114; 318/700–722
See application file for complete search history.

(56) References Cited

U.S. PATENT DOCUMENTS

| | | | | |
|---|---|---|---|---|
| 5,793,167 | A * | 8/1998 | Liang et al. | 318/141 |
| 6,278,194 | B1 * | 8/2001 | Nakagawa et al. | 290/31 |
| 6,777,846 | B2 * | 8/2004 | Feldner et al. | 310/200 |
| 7,170,263 | B2 * | 1/2007 | Yamamoto et al. | 322/59 |
| 7,459,877 | B2 * | 12/2008 | Cook | 318/778 |
| 7,531,974 | B2 * | 5/2009 | Ohtsuka et al. | 318/146 |
| 2009/0063008 | A1 * | 3/2009 | Ishikawa et al. | 701/102 |

FOREIGN PATENT DOCUMENTS

| | | |
|---|---|---|
| EP | 1921736 A2 | 5/2008 |
| JP | 63-206103 | 8/1988 |
| JP | 65024/1994 | 9/1994 |
| JP | 07-222304 | 8/1995 |
| JP | 10-201110 | 7/1998 |
| JP | 2000-032798 | 1/2000 |
| JP | 2001-026221 | 1/2001 |

(Continued)

OTHER PUBLICATIONS

JP Office Action dated Dec. 28, 2012 for JP Application No. 49187/2010 filed Mar. 5, 2010, 3 pages.

(Continued)

*Primary Examiner* — Christopher Schwartz
(74) *Attorney, Agent, or Firm* — Patterson Thuente Pedersen, P.A.

(57) ABSTRACT

An electromagnetic type retarder comprises a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of three-phase or two-phase connections. Each of the magnetic coils is connected with a capacitor so as to form a resonance circuit, respectively. The driving device has transistors connected in series to each of the connections and controlled so as to be opened and closed by the operation signal. The revolution speed of a rotary magnetic field generated by AC voltage induced in the magnetic coils forming the resonance circuits by the rotation of the steel rotor is set smaller than the revolution speed of the steel rotor. The AC voltage is applied to an input terminal of the additional device through a timer after a predetermined time from the generation of the operation signal.

21 Claims, 8 Drawing Sheets

(56) References Cited

FOREIGN PATENT DOCUMENTS

| JP | 2004-048943 | 2/2004 |
| JP | 2009-048943 | 2/2004 |
| JP | 2005-219574 | 8/2005 |
| JP | 2008-125219 | 5/2008 |
| JP | 2009-007998 | 1/2009 |

OTHER PUBLICATIONS

CN Office Action dated Feb. 1, 2013 for CN Application No. 201110033626.9, 2 pages.

* cited by examiner

ELECTROMAGNETIC TYPE RETARDER

RELATED APPLICATION

The present application claims priority to Japanese Application No. 2010-49187 filed Mar. 5, 2010, which is incorporated herein in its entirety by reference.

FIELD OF THE INVENTION

The present invention relates to an electromagnetic type retarder, and more particularly, relates to an electromagnetic type retarder which is an auxiliary braking device for use in a large car, such as a truck, bus or the like.

BACKGROUND OF THE INVENTION

An electromagnetic type retarder for obtaining a brake torque by utilizing an electric eddy current is publicly known as shown in the Japanese patent application Laid-Open No. 125219/2008.

FIG. 5 to FIG. 7 herein depicts show a conventional self generation electromagnetic type retarder, wherein a reference numeral 1 denotes a tire of a car, 2 denotes a starter, 4 denotes an alternator, and 5 denotes an electromagnetic type retarder. The electromagnetic type retarder 5 comprises a main portion 6, a control device 8 for processing an operation signal 7, and a driving device 10 consisting of transistors T1 to T3 opened and closed by a drive pulse 9 from the control device 8, respectively.

The main portion 6 comprises a stator yoke 11, a stator 12 having magnetic coils L1 to L12, each having an iron core, arranged along a circle and spaced apart from one another, a steel rotor (drum) 13 surrounding the stator 12 and rotated according to the rotation of the tire 1, and fins 14 provided on the outer peripheral surface of the drum 13.

The magnetic coils L1 to L12 form three-phase connections of A phase, B phase and C phase.

Each of the magnetic coils L1, L2, L3, L7, L8 and L9 is opposite in polarity to each of the magnetic coils L4, L5, L6, L10, L11 and L12.

According to the conventional retarder, the drive pulse 9 is generated when the operation signal 7 is applied to the control device 8, so that the transistors T1 to T3 of the driving device 10 are turned ON, and resonance circuits consisting of magnetic coils L1 to L12 and capacitors C are formed.

An electric voltage induced in the magnetic coils by the residual magnetic field of the drum 13 becomes a three-phase AC voltage of a specific frequency by the function of the resonance circuits consisting of the magnetic coils and the capacitors, when the revolution number of the drum 13 becomes faster than that of the rotary magnetic field calculated from the resonance frequency of the magnetic coils and the capacitors. In this state, an eddy current is generated in the drum 13 according to the difference between the revolution number Ns of the rotary magnetic field generated by the three-phase AC voltage and the revolution number Nd of the drum 13. By the eddy current generated in the drum 13, the voltage of the magnetic coils is increased, so that the eddy current generated in the drum 13 is further increased.

The increase of the eddy current function is stopped at a point that the magnetic field is not increased even if the voltage of magnetic coils is increased. The eddy current in the drum 13 generates a joule heat, so that a larger braking power is applied to the drum 13. The braking energy is converted into heat and the heat is radiated into the atmosphere from the fins 14 provided on the outer peripheral surface of the drum 13.

A diesel engine prominently used as a commercial car engine has additionally an automatic stop device or an auxiliary heating device as described in the Japanese Utility Model Application Laid-Open No. 65024/1994, because such use of a diesel engine is repeatedly idled or run for a short time. A large electric power is required for such additional device and accordingly it is necessary to use an additional power source or an alternator; this results in an increase of weight and cost.

FIG. 8 is a graph indicating the relationship between an electric current passing through the electromagnetic coils and a voltage induced in the electromagnetic coils when the revolution number of the steel rotor becomes faster than that of the rotary magnetic field. In FIG. 8, a reference symbol A denotes a saturated point of the voltage induced in the electromagnetic coils, an impedance line extending from the point A denotes a voltage which is impossible to take out because an electric energy is consumed in the electromagnetic coils, a reference symbol B denotes an unsaturated point, and a reference symbol C denotes a point on the impedance line corresponding to the point B. The voltage difference between the points B and C becomes an electric power $P_{out}$ which is possible to take out. $P_{out} = C(V_B^2 - V_C^2)/T_0$, where C is a value of capacitor, $V_B$ is a voltage at the point B, $V_C$ is a voltage at the point C, and $T_0$ is a period.

According to experiments and study by the inventor, a self generation electromagnetic type retarder shown in FIG. 5 to FIG. 7 has a very high power generating ability, and it is possible to supply a power three times larger than the power of the alternator, without increasing the weight and cost, and it is possible to supply to the additional device as mentioned above a high AC voltage or low DC voltage.

Further, the inventor has determined that the induced voltage directly after the start of the retarder is so small that no electric power can be supplied as shown in FIG. 3 and FIG. 8.

The present invention can be obtained on the basis of the above facts.

SUMMARY OF THE INVENTION

An object of the present invention is to provide an electromagnetic type retarder comprising a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of three-phase connections of A phase, B phase and C phase, each of the magnetic coils being connected with a capacitor so as to form a resonance circuit, respectively, the driving device having transistors connected in series to each of the three-phase connections and controlled so as to be opened and closed by the operation signal, wherein the revolution speed of a rotary magnetic field generated by three-phase AC voltage induced in the magnetic coils forming the resonance circuits by the rotation of the steel rotor is set smaller than the revolution speed of the steel rotor, and wherein the three-phase AC voltage is applied to an input terminal of the additional device through a timer after a predetermined time from the generation of the operation signal.

A further object of the present invention is to provide an electromagnetic type retarder comprising a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of three-phase connections of A phase, B phase and C phase, each of the magnetic coils being connected with a capacitor so as to form a resonance circuit, respectively, the driving device having transistors connected in series to each of the three-phase connections and controlled so as to be opened and closed by the operation signal, wherein the revolution speed of a rotary magnetic field generated by three-phase AC voltage induced in the magnetic coils forming the resonance circuits by the rotation of the steel rotor is set smaller than the revolution speed of the steel rotor, and wherein the three-phase AC voltage is rectified to a DC voltage and applied to an input terminal of the additional device.

In embodiments, the three-phase connections are formed of a three-phase star connection, or a three-phase delta connection.

Yet a further object of the present invention is to provide an electromagnetic type retarder comprising a main portion consisting of a stator having a plurality of magnetic coils arranged along a circle and spaced apart from one another, and of a steel rotor surrounding the stator and rotated according to the rotation of a tire; and a driving device for the main portion to be controlled by an operation signal; and an output terminal for an additional device; the magnetic coils consisting of two-phase V connection, each of the magnetic coils being connected with a capacitor so as to form a resonance circuit, respectively, the driving device having transistors connected in series to each of the two-phase V connections and controlled so as to be opened and closed by the operation signal, wherein the revolution speed of a rotary magnetic field due to a two-phase AC voltage induced in the magnetic coils forming the resonance circuits by the rotation of the steel rotor is set smaller than the revolution speed of the steel rotor, and wherein the two-phase AC voltage is applied to an input terminal of the additional device through a timer after a predetermined time from the generation of the operation signal.

Another object of the present invention is to provide an electromagnetic type retarder comprising a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of two-phase V connections, each of the magnetic coils being connected with a capacitor so as to form a resonance circuit, respectively, the driving device having transistors connected in series to each of the two-phase V connections and controlled so as to be opened and closed by the operation signal, wherein the revolution speed of a rotary magnetic field generated by two-phase AC voltage induced in the magnetic coils forming the resonance circuits by the rotation of the steel rotor is set smaller than the revolution speed of the steel rotor, and wherein the two-phase AC voltage is rectified to a DC voltage and applied to an input terminal of the additional device.

In embodiments, the DC voltage is applied to the input terminal of the additional device through a voltage reduction device.

In embodiments, the additional device is a battery for supplying an idling stop power.

According to the electromagnetic type retarder of embodiments of the present invention the following effects can be obtained.

(1) It is possible to supply electric power to the auxiliary heater or the additional device, such as a battery, the device being adapted for supplying an electric power to restart the engine in the idling stop control device otherwise adapted for automatically stopping the engine when the car is stopped.

(2) It is not necessary to charge the battery by the alternator in order to restart the engine in the idling stop control device otherwise adapted for automatically stopping the engine when the car is stopped.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

An embodiment of an electromagnetic type retarder according to the present invention will be explained with reference to the drawings.

Embodiment 1

Figure 1:
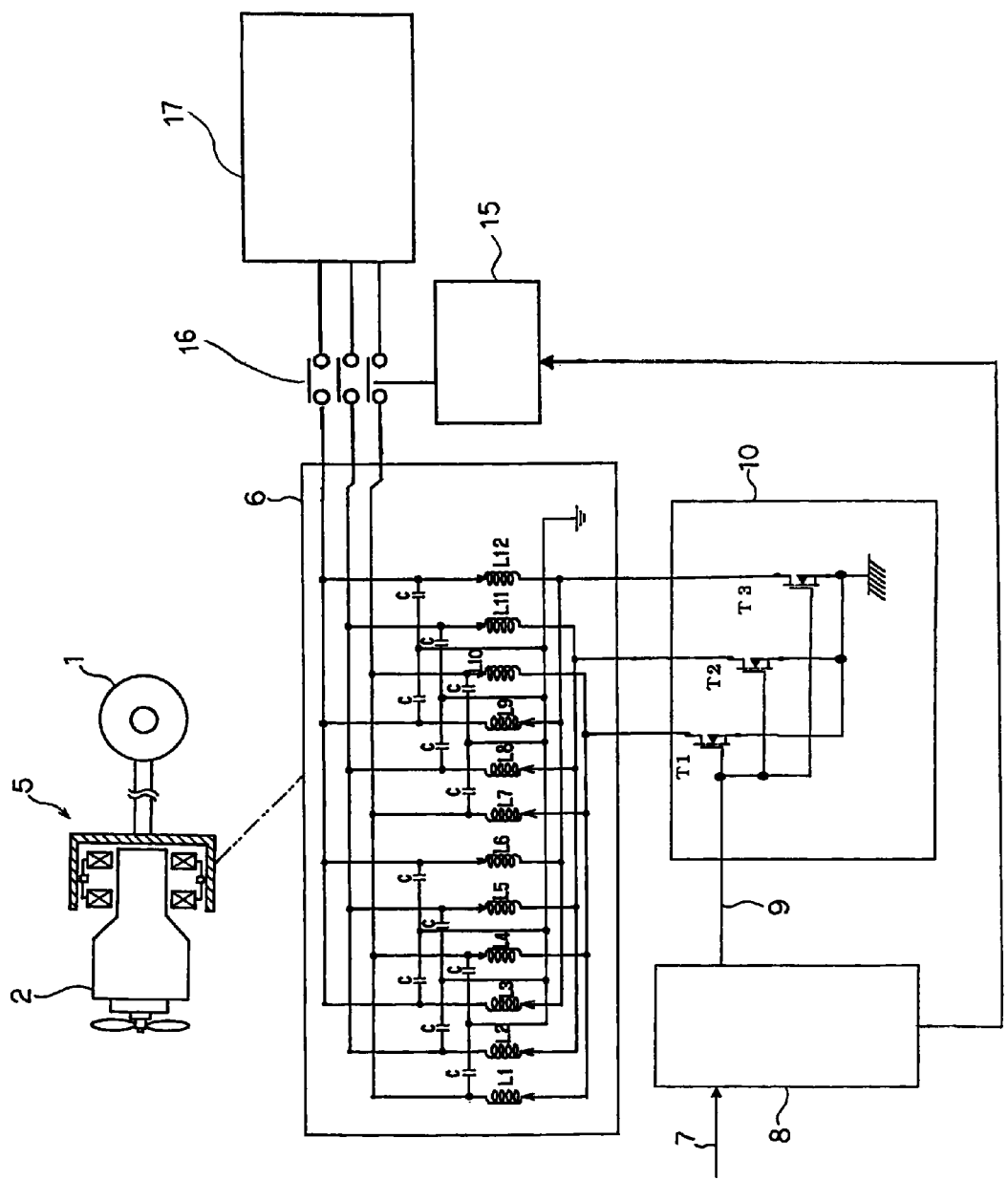
FIG. 1 is a schematic depiction of an embodiment of an electromagnetic type retarder according to the present invention.

FIG. 1 depicts a first embodiment of an electromagnetic type retarder according to the present invention.

Figure 5:
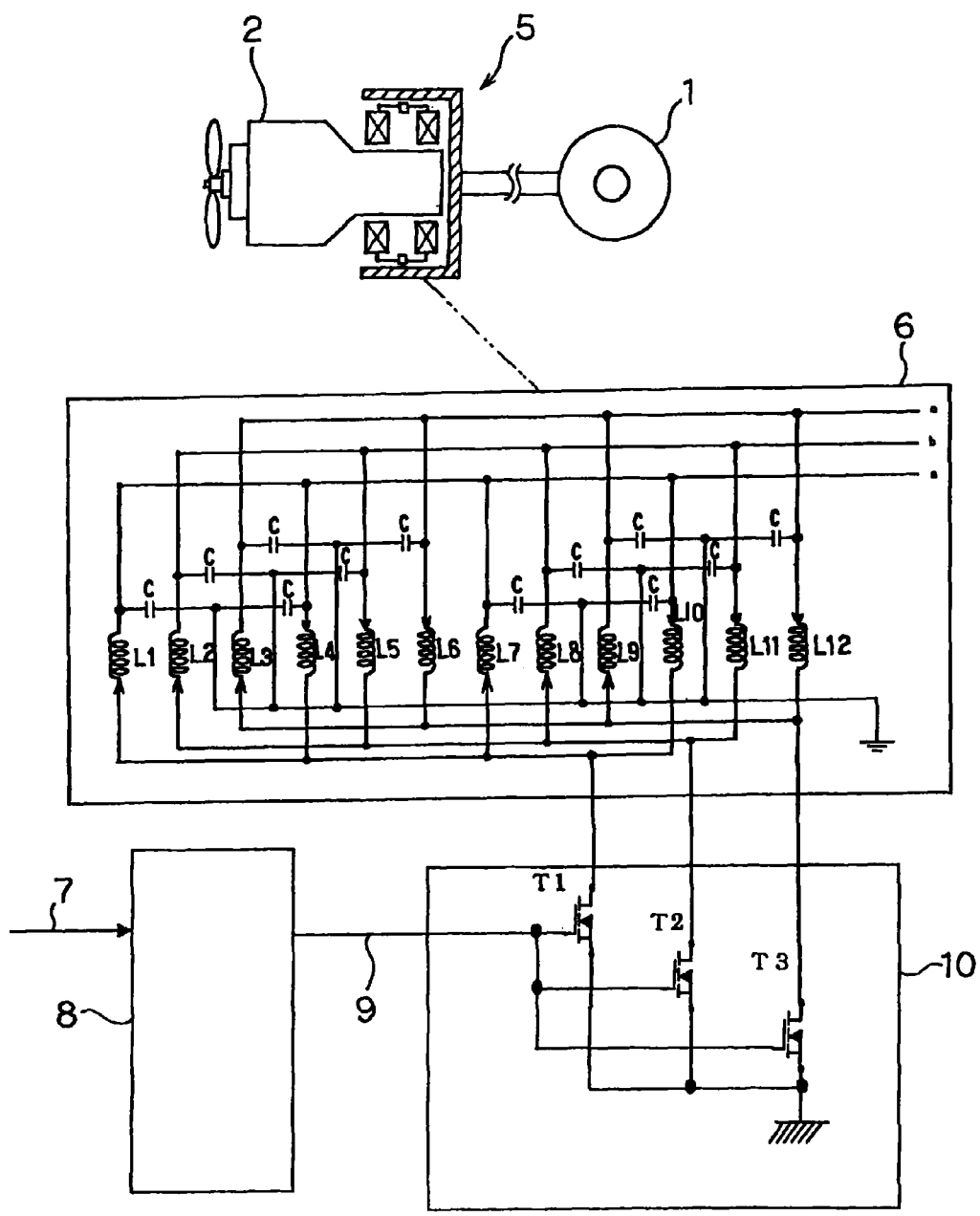
FIG. 5 is a schematic depiction of a conventional electromagnetic type retarder.
Figure 6:
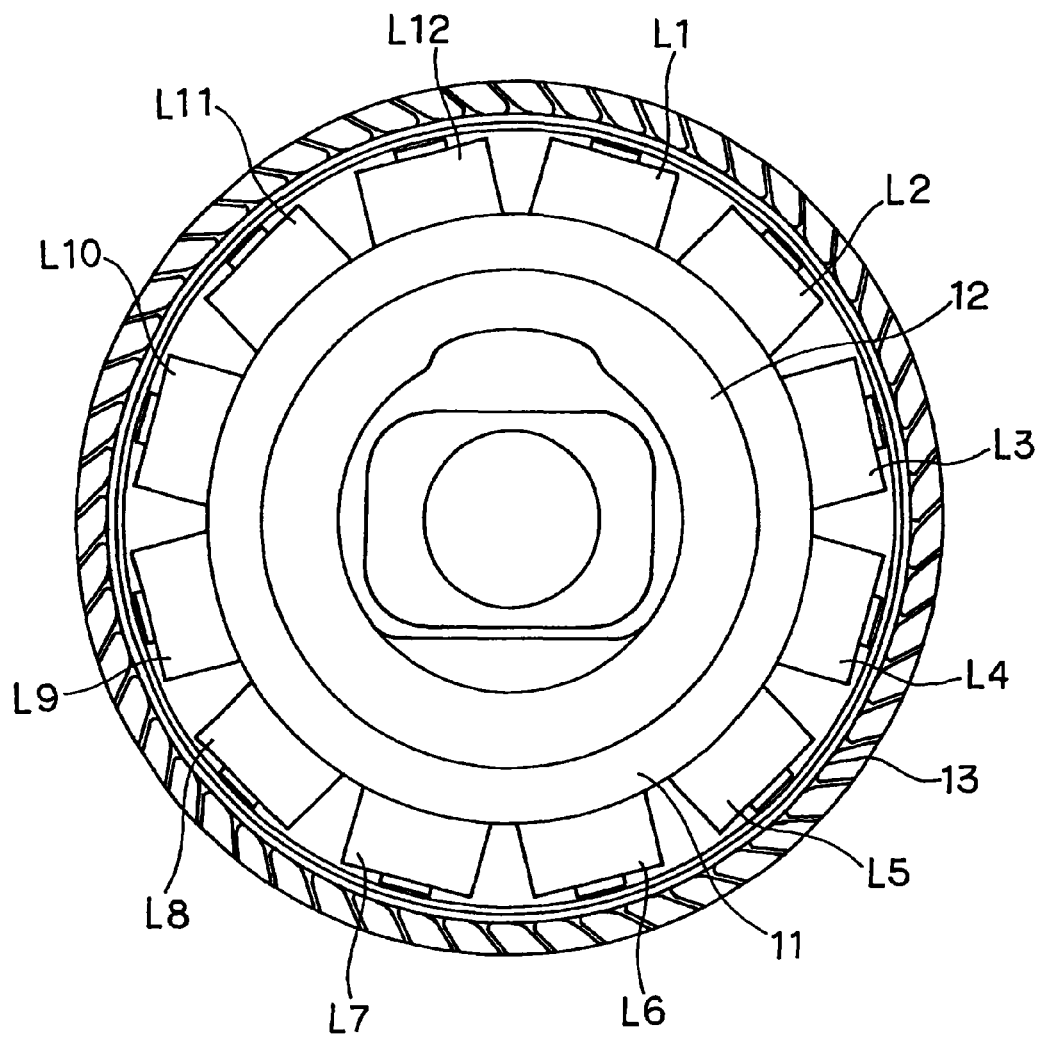
FIG. 6 is a vertically sectional front view of a main portion in the conventional retarder of FIG. 5.
Figure 7:
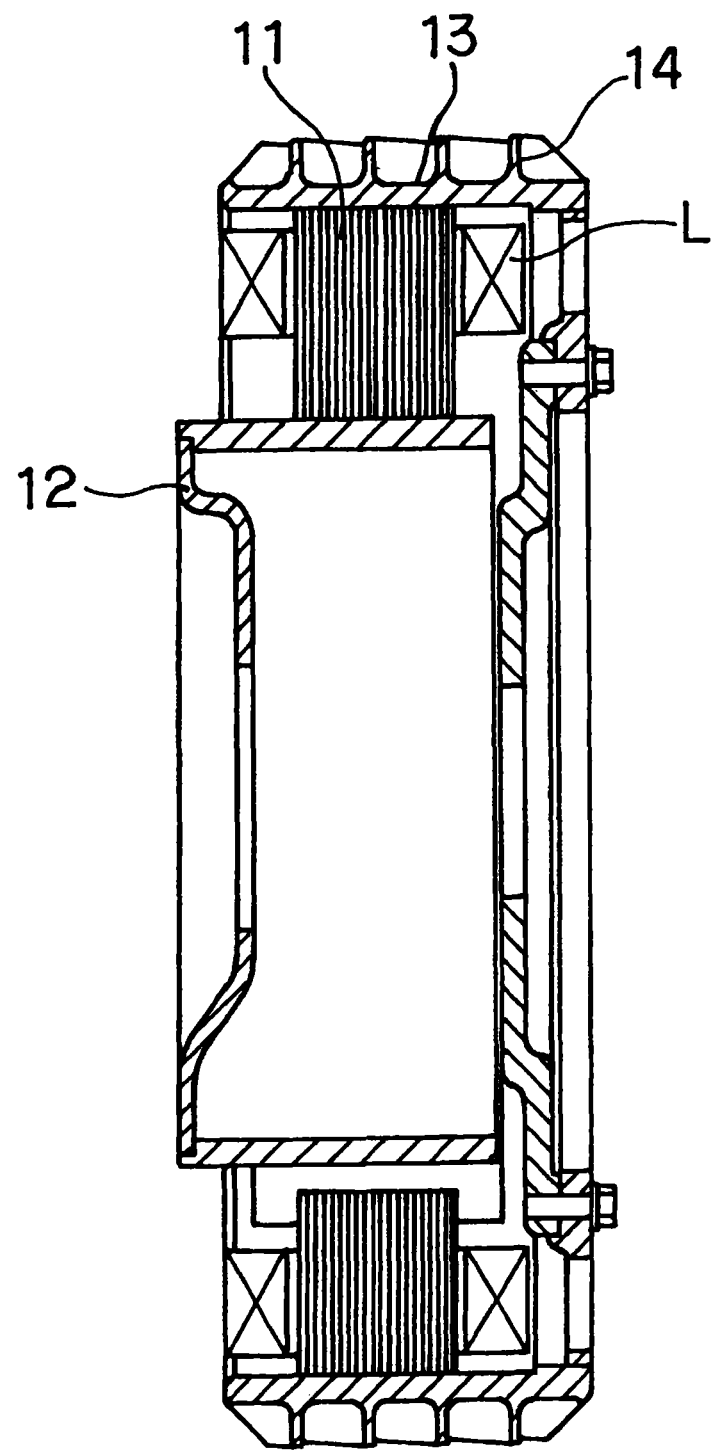
FIG. 7 is a vertically sectional side view of the main portion in the conventional retarder of FIG. 5.
Figure 8:
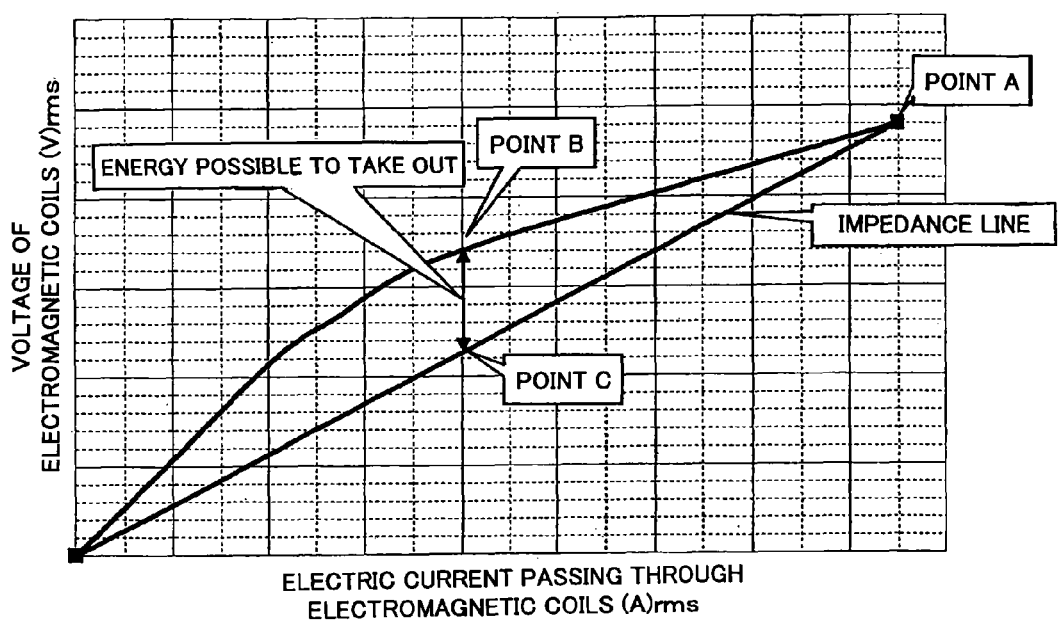
FIG. 8 is a graph depicting the relationship of a voltage induced in the electromagnetic coils and a electric current passing through the electromagnetic coils of the conventional retarder of FIG. 5.

Parts of the retarder which are similar to corresponding parts of the conventional retarder shown in FIG. 5 to FIG. 7 have been given corresponding reference numerals and need not be further redescribed.

In the first embodiment of the present invention, a three-phase AC voltage or a two-phase AC voltage generated in a self generation electromagnetic type retarder 5 is applied to an output terminal (not shown) for an additional device, such as an auxiliary heater 17 through an ON-OFF contact 16 of a timer 15 controlled by a control device 8.

The ON-OFF contact 16 is turned ON after one second, for example, from the generation of a retarder operation signal 7, at which the voltage generated by the retarder 5 becomes so high that a sufficient energy can be taken out from the retarder 5.

According to the electromagnetic type retarder of the present invention, an additional electric power source for the additional device can be omitted.

Embodiment 2

Figure 2:
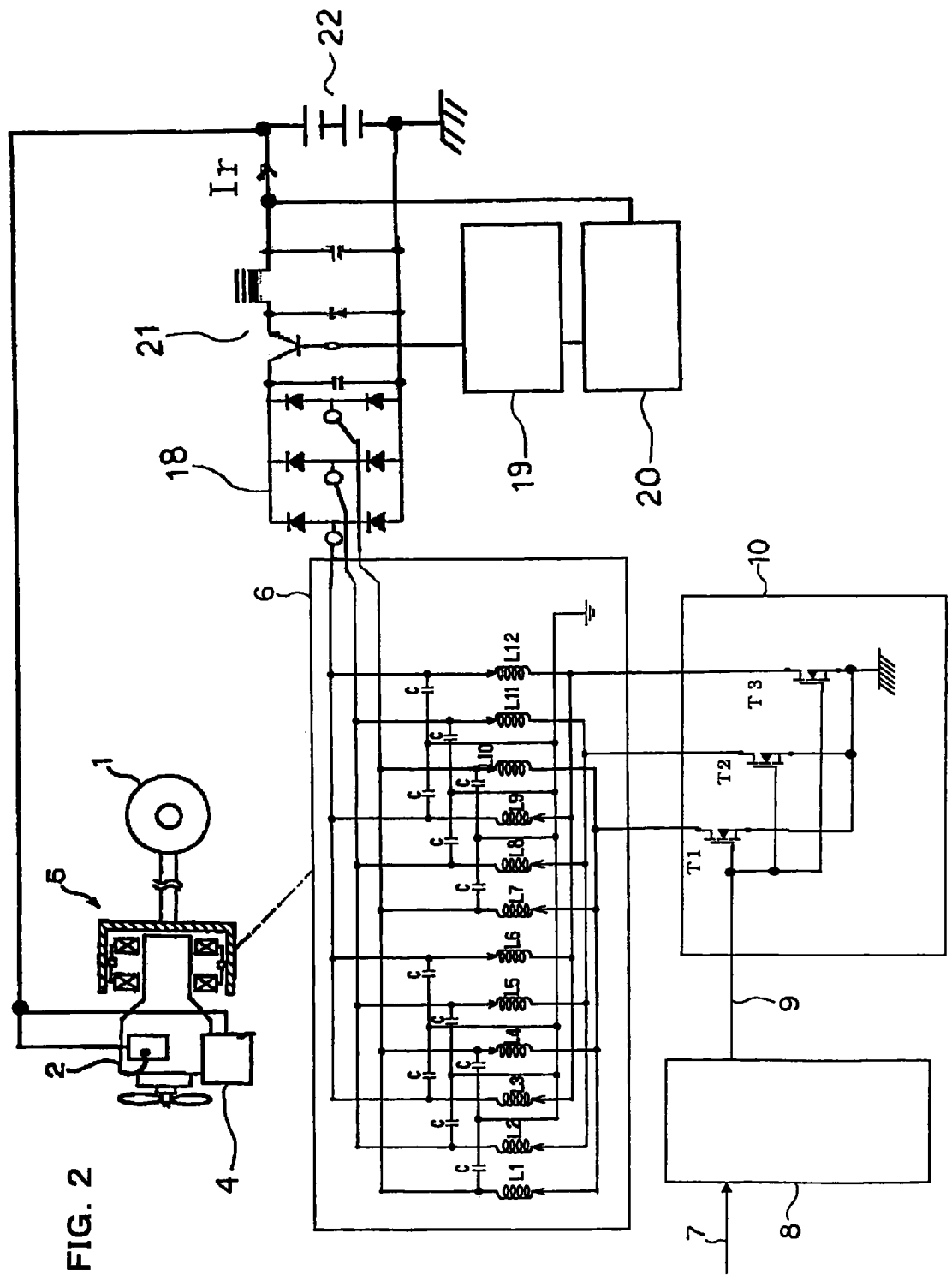
FIG. 2 is a schematic depiction of another embodiment of an electric retarder according to the present invention.
Figure 3:
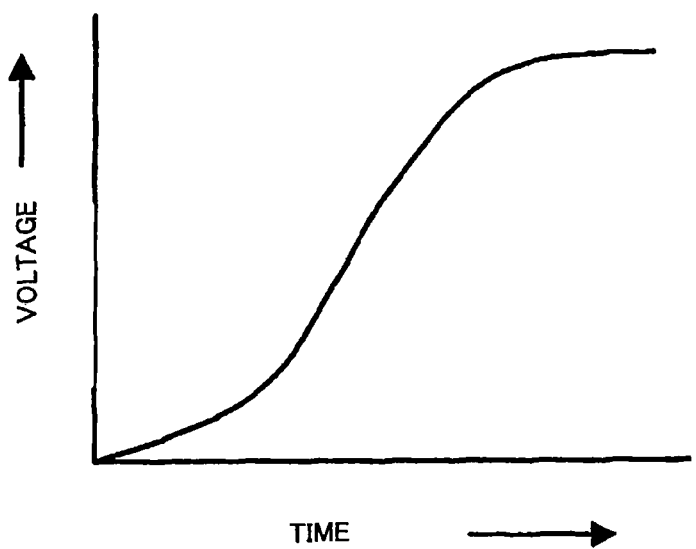
FIG. 3 is a graph depicting the relationship of a generated voltage and time of the retarder according to the present invention.

FIG. 2 shows a second embodiment of an electromagnetic type retarder according to the present invention.

Parts of the retarder which are similar to corresponding parts of the conventional retarder shown in FIG. 5 to FIG. 7 have been given corresponding reference numerals and need not be further redescribed.

In the second embodiment of the present invention, the additional device is a battery 22 for supplying an idling stop power, which is required to restart an engine after the idling is stopped automatically, for example.

In the second embodiment of the present invention, a three-phase AC voltage or a two-phase AC voltage generated in a self generation electromagnetic type retarder 5 is rectified by a full-wave rectifier 18, for example, reduced in voltage by a chopper 21 having a duty controller 19 and CPU 20, and applied to the battery 22 for supplying an idling stop power to charge the battery 22.

An electric current Ir for charging the battery 22 is reduced by the chopper 21 to prevent the service life of the battery 22 for supplying the idling stop power from being shortened by the over charge, when the voltage of the battery is increased to a full charge value.

According to the second embodiment of the present invention, it is not necessary to always charge by an alternator 4 driven by a starter 2 the battery for supplying idling stop power.

Figure 4:
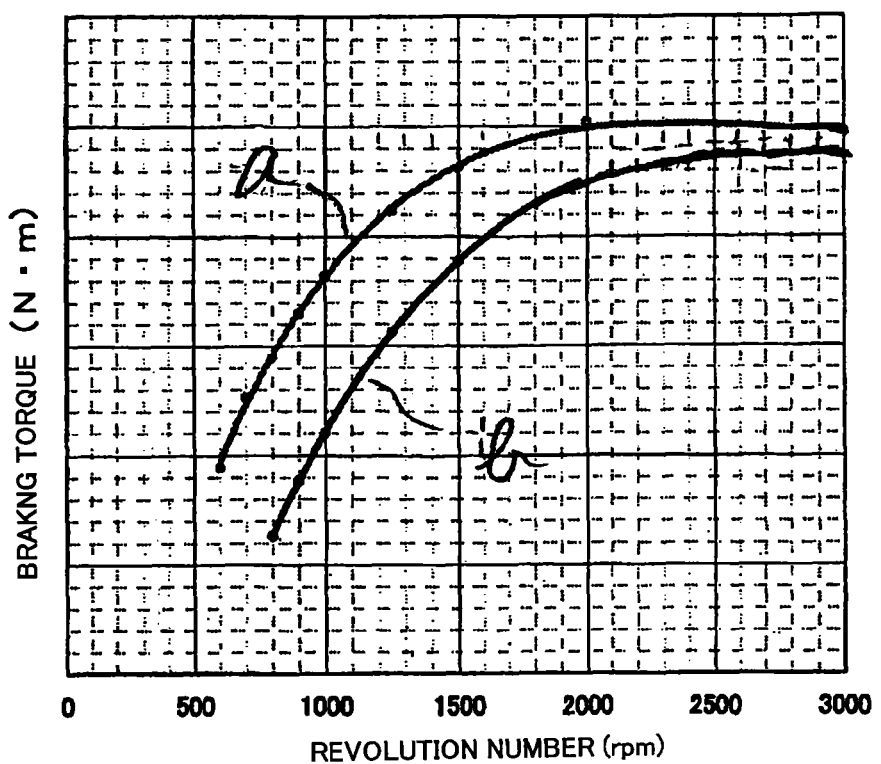
FIG. 4 is a graph depicting the relationship of a braking torque and a revolution number of a rotor of the retarder.

FIG. 4 is a diagram for explaining the relationship of a braking torque and a revolution number of the rotor according to the self generation electromagnetic type retarder of the present invention, wherein a symbol a shows a curve when no electric power is supplied to the additional device, such as the battery for supplying the idling stop power, and a symbol b shows a curve when the electric power is supplied.

A large difference in braking torque is not recognized between the curves a and b.

Further, the three-phase AC voltage generated by the self generation electromagnetic type retarder can be increased, if the number of the electromagnetic coils is increased from 12 to 24, for example.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. An electromagnetic type retarder comprising a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of three-phase connections of A phase, B phase and C phase, each of the magnetic coils being connected with a capacitor so as to form a resonance circuit, respectively, the driving device having transistors connected in series to each of the three-phase connections and controlled so as to be opened and closed by the operation signal, wherein the revolution speed of a rotary magnetic field generated by three-phase AC voltage induced in the magnetic coils forming the resonance circuits by the rotation of the steel rotor is set smaller than the revolution speed of the steel rotor, and wherein the three-phase AC voltage is rectified to a DC voltage and applied to an input terminal of the additional device.

2. The electromagnetic type retarder as claimed in claim 1, wherein the three-phase connections are formed of a three-phase star connection.

3. The electromagnetic type retarder as claimed in claim 2, wherein the DC voltage is applied to the input terminal of the additional device through a voltage reduction device.

4. The electromagnetic type retarder as claimed in claim 3, wherein the additional device is a battery for supplying an idling stop power.

5. The electromagnetic type retarder as claimed in claim 1, wherein the three-phase connections are formed of a three-phase delta connection.

6. The electromagnetic type retarder as claimed in claim 5, wherein the DC voltage is applied to the input terminal of the additional device through a voltage reduction device.

7. The electromagnetic type retarder as claimed in claim 6, wherein the additional device is a battery for supplying an idling stop power.

8. The electromagnetic type retarder as claimed in claim 1, wherein the DC voltage is applied to the input terminal of the additional device through a voltage reduction device.

9. The electromagnetic type retarder as claimed in claim 8, wherein the additional device is a battery for supplying an idling stop power.

10. The electromagnetic type retarder as claimed in claim 1, wherein the additional device is a battery for supplying an idling stop power.

11. An electromagnetic type retarder comprising a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of three-phase connections of A phase, B phase and C phase, each of the magnetic coils being connected with a capacitor so as to form a resonance circuit, respectively, the driving device having transistors connected in series to each of the three-phase connections and controlled so as to be opened and closed by the operation signal, wherein the revolution speed of a rotary magnetic field generated by three-phase AC voltage induced in the magnetic coils forming the resonance circuits by the rotation of the steel rotor is set smaller than the revolution speed of the steel rotor, and wherein the three-phase AC voltage is applied to an input terminal of the additional device through a timer after a predetermined time from the generation of the operation signal.

12. The electromagnetic type retarder as claimed in claim 11, wherein the three-phase connections are formed of a three-phase star connection.

13. An electromagnetic type retarder as claimed in claim 12, wherein the additional device is an auxiliary heater.

14. The electromagnetic type retarder as claimed in claim 11, wherein the three-phase connections are formed of a three-phase delta connection.

15. An electromagnetic type retarder as claimed in claim 14, wherein the additional device is an auxiliary heater.

16. The electromagnetic type retarder as claimed in claim 11 wherein the additional device is an auxiliary heater.

17. An electromagnetic type retarder comprising a main portion consisting of a stator having a plurality of magnetic coils arranged along a circle and spaced apart from one another, and of a steel rotor surrounding the stator and rotated according to the rotation of a tire; a driving device for the main portion to be controlled by an operation signal; and an output terminal for an additional device; the magnetic coils consisting of two-phase V connections, each of the magnetic coils being connected with a capacitor so as to form a resonance circuit, respectively, the driving device having transistors connected in series to each of the two-phase V connections and controlled so as to be opened and closed by the operation signal, wherein the revolution speed of a rotary magnetic field generated by two-phase AC voltage induced in the magnetic coils forming the resonance circuits by the rotation of the steel rotor is set smaller than the revolution speed of the steel rotor, and wherein the two-phase AC voltage is rectified to a DC voltage and applied to an input terminal of the additional device.

18. The electromagnetic type retarder as claimed in claim 17, wherein the DC voltage is applied to the input terminal of the additional device through a voltage reduction device.

19. The electromagnetic type retarder as claimed in claim 17, wherein the additional device is a battery for supplying an idling stop power.

20. An electromagnetic type retarder comprising a main portion consisting of a stator having a plurality of magnetic coils arranged along a circle and spaced apart from one another, and of a steel rotor surrounding the stator and rotated according to the rotation of a tire;

and a driving device for the main portion to be controlled by an operation signal; and an output terminal for an additional device; the magnetic coils consisting of two-phase V connection, each of the magnetic coils being connected with a capacitor so as to form a resonance circuit, respectively, the driving device having transistors connected in series to each of the two-phase V connections and controlled so as to be opened and closed by the operation signal, wherein the revolution speed of a rotary magnetic field due to a two-phase AC voltage induced in the magnetic coils forming the resonance circuits by the rotation of the steel rotor is set smaller than the revolution speed of the steel rotor, and wherein the two-phase AC voltage is applied to an input terminal of the additional device through a timer after a predetermined time from the generation of the operation signal.

21. An electromagnetic type retarder as claimed in claim 20, wherein the additional device is an auxiliary heater.

\* \* \* \* \*